(12) United States Patent
Coney et al.

(10) Patent No.: US 7,255,196 B1
(45) Date of Patent: Aug. 14, 2007

(54) WINDSHIELD AND SOUND-BARRIER FOR SEISMIC SENSORS

(75) Inventors: William B. Coney, Littleton, MA (US); Peter A. Krumhansl, Amherst, NH (US)

(73) Assignee: BBN Technologies Corp., Cambridge, MA (US)

( * ) Notice: Subject to any disclaimer, the term of this patent is extended or adjusted under 35 U.S.C. 154(b) by 341 days.

(21) Appl. No.: 10/713,935

(22) Filed: Nov. 14, 2003

Related U.S. Application Data

(60) Provisional application No. 60/427,671, filed on Nov. 19, 2002.

(51) Int. Cl.
*G01V 1/18* (2006.01)
*G10K 11/16* (2006.01)
*G01V 1/16* (2006.01)

(52) U.S. Cl. ............ 181/122; 181/108; 181/205; 181/198; 381/359; 367/901

(58) Field of Classification Search ............ 181/122, 181/108, 205, 198; 381/359; 367/901
See application file for complete search history.

(56) References Cited

U.S. PATENT DOCUMENTS

| | | | | |
|---|---|---|---|---|
| 2,200,097 A | * | 5/1940 | Phelps | 181/242 |
| 2,307,792 A | * | 1/1943 | Hoover, Jr. | 367/183 |
| 2,325,424 A | * | 7/1943 | Rettinger | 181/242 |
| 2,411,117 A | | 11/1946 | Scherbatskoy | |
| 2,417,077 A | * | 3/1947 | Hoover, Jr. | 367/183 |
| 2,520,706 A | * | 8/1950 | Anderson et al. | 181/242 |
| 2,645,123 A | | 7/1953 | Hundstad | |
| 2,772,746 A | * | 12/1956 | Merten | 181/114 |
| 2,776,010 A | | 1/1957 | Rike | |
| 3,067,404 A | | 12/1962 | Hildebrandt | |
| 3,479,886 A | | 11/1969 | Canfield | |
| 3,550,720 A | * | 12/1970 | Ballard et al. | 181/175 |
| 3,572,462 A | * | 3/1971 | Gray | 181/110 |
| 3,953,829 A | | 4/1976 | Boyle | |
| 3,992,951 A | | 11/1976 | Erspamer et al. | |
| 4,020,919 A | * | 5/1977 | Broding | 181/119 |
| 4,065,648 A | * | 12/1977 | Cvetko et al. | 381/359 |
| 4,159,464 A | | 6/1979 | Hall, Jr. | |
| 4,382,201 A | | 5/1983 | Trzaskos | |
| 4,570,746 A | * | 2/1986 | Das et al. | 381/359 |
| 4,600,077 A | * | 7/1986 | Drever | 181/242 |
| 4,625,201 A | | 11/1986 | Berry | |
| 4,625,827 A | * | 12/1986 | Bartlett | 181/158 |
| 4,692,912 A | | 9/1987 | Mueller et al. | |

(Continued)

FOREIGN PATENT DOCUMENTS

JP 59217122 A * 12/1984

OTHER PUBLICATIONS

Albert, Donald G. and Orcutt, John A., "Observations of low-frequency acoustic-to-seismic coupling in the summer and winter," J. Acoust. Soc. Am. 86(1): 352-359 (Jul. 1989).

(Continued)

*Primary Examiner*—Edgardo San Martin
(74) *Attorney, Agent, or Firm*—Fish & Neave IP Group Ropes & Gray LLP

(57) ABSTRACT

A system and method for reducing acoustic, wind or other background noise that may interfere with sensing of a seismic signal is provided. More specifically, a shield is provided to enclose a geophone and thereby protect it from harmful noise. The shield may comprise a rigid shell, a structural damping material, an acoustically absorptive material, and a compliant seal for coupling the shield to the ground or reference surface.

30 Claims, 7 Drawing Sheets

U.S. PATENT DOCUMENTS

| | | | |
|---|---|---|---|
| 4,750,157 A | | 6/1988 | Shei |
| 4,764,908 A | | 8/1988 | Greer, Jr. |
| 4,899,845 A | * | 2/1990 | Bosco et al. ............... 181/122 |
| 5,010,531 A | | 4/1991 | McNeel |
| 5,150,104 A | | 9/1992 | Thomas et al. |
| 5,231,252 A | * | 7/1993 | Sansone .................... 181/122 |
| 5,288,955 A | * | 2/1994 | Staple et al. ............... 181/158 |
| 5,339,292 A | | 8/1994 | Brown et al. |
| 5,343,744 A | | 9/1994 | Ammann |
| 5,398,035 A | * | 3/1995 | Densmore et al. .......... 343/713 |
| 5,435,178 A | | 7/1995 | Edwards |
| 5,444,790 A | * | 8/1995 | Kogen ........................ 381/359 |
| 5,457,995 A | | 10/1995 | Staton et al. |
| 5,469,408 A | | 11/1995 | Woo |
| 5,473,702 A | | 12/1995 | Yoshida et al. |
| 5,477,506 A | * | 12/1995 | Allen .......................... 367/140 |
| 5,492,016 A | | 2/1996 | Pinto et al. |
| 5,684,756 A | * | 11/1997 | Schmitz et al. ............. 367/188 |
| 5,808,243 A | * | 9/1998 | McCormick et al. ........ 181/0.5 |
| 5,917,921 A | | 6/1999 | Sasaki et al. |
| 5,929,754 A | | 7/1999 | Park et al. |
| 5,978,317 A | | 11/1999 | Whitener |
| 5,996,411 A | | 12/1999 | Leonardson et al. |
| 6,393,913 B1 | | 5/2002 | Dyck et al. |
| 6,502,459 B1 | | 1/2003 | Bonne et al. |
| 6,507,790 B1 | | 1/2003 | Radomski |
| 6,538,612 B1 | * | 3/2003 | King .......................... 343/757 |
| 6,604,432 B1 | | 8/2003 | Hamblen et al. |
| 6,609,069 B2 | | 8/2003 | Gysling |
| 6,805,008 B2 | | 10/2004 | Selvakumar et al. |
| 6,854,330 B2 | | 2/2005 | Potter |
| 6,935,458 B2 | * | 8/2005 | Owens ....................... 181/205 |
| 6,963,649 B2 | | 11/2005 | Vaudrey et al. |
| 6,978,673 B2 | | 12/2005 | Johnson et al. |
| 2002/0104379 A1 | * | 8/2002 | Ried et al. ............... 73/514.32 |
| 2003/0179103 A1 | * | 9/2003 | Kamata ................. 340/870.16 |
| 2005/0171710 A1 | * | 8/2005 | Gysling et al. ............... 702/54 |
| 2006/0013425 A1 | * | 1/2006 | Kargus et al. ............... 381/359 |

OTHER PUBLICATIONS

Attenborough, Keith et al., "The acoustic transfer function at the surface of a layered poroelastic soil," J. Acoust. Soc. Am. 79(5): 1353-1358 (1986).

Bass, H.E. et al., "Coupling of airborne sound into the earth: Frequency dependence," J. Acoust. Soc. Am. 67(5): 1502-1506 (May 1980).

Bland, H.C. and Gallant, E.V., "Avoiding wind noise: How helpful is geophone-burying?," CSEG Geophysics 2002, p. 1-4 (May 2002).

Bland, Henry C. and Gallant, Eric V., "Wind noise abatement for 3-C geophones," CREWES Research Report, 13: 1-14 (2001).

Dey, Ayon K. et al., "Noise suppression on geophone data using microphone measurements," CREWES Research Report, vol. 12 (2000).

Knapp, Ralph W., "Short Note, Observations of the air-coupled wave as a function of depth," Geophysics, 51(9): 1853-1857 Figs. (Sep. 1986).

Sabatier, James M. et al., "Acoustically induced seismic waves," J. Acoust. Soc. Am., 80(2): 646-649 (Aug. 1986).

Sabatier, James M. et al., "The interaction of airborne sound with the porous ground: The theoretical formulation," J. Acoust. Soc. Am., 79(5): 1345-1352 (May 1986).

Sabatier, James M. et al., "On the location of frequencies of maximum acoustic-to-seismic coupling," J. Acoust. Soc. Am. 80(4): 1200-1202 (Oct. 1986).

Withers, Mitchell M. et al., "High-Frequency Analysis of Seismic Background Noise as a Function of Wind Speed and Shallow Depth," Bulletin of the Seismological Society of America, 86(5): 1507-1515 (Oct. 1996).

Young, Christopher J. et al., "A Comparison of the High-Frequency (>1 Hz) Surface and Subsurface Noise Environment at Three Sites in the United States," Bulletin of the Seismological Society of America, 86(5): 1516-1528 (Oct. 1996).

Shust et al, "Electronic Removal of Outdoor Microphone Wind Noise," Acoustical Society of America; Presented Oct. 13, 1998; Published Jan. 11, 2002.

Bleazey, John C., "Experimental Determination of the Effectiveness of Microphone Wind Screens," Journal of the Audio Engineering Society; 9:48-54; Jan. 1961.

Beranek, Leo L., "Acoustical Measurements," Published for the Acoustical Society of America by the American Institute of Physics, 1988 Editions, pp. 258-263.

* cited by examiner

WINDSHIELD AND SOUND-BARRIER FOR SEISMIC SENSORS

CROSS REFERENCE TO RELATED APPLICATIONS

This application claims priority under 35 U.S.C. § 119(e) to U.S. Provisional Application No. 60/427,671, titled "Windshield and Sound-Barrier for Seismic Sensors," filed Nov. 19, 2002, the entirety of which is hereby incorporated by reference.

STATEMENT REGARDING FEDERALLY SPONSORED RESEARCH OR DEVELOPMENT

This invention was made by an agency of the United States Government, or under contract with an agency of the United States Government. The name of the United States Government agency and the government contract number are: DARPA/SPO, Contract Number F33615-02-C-1262.

BACKGROUND OF THE INVENTION

1. Field of the Invention

This invention relates generally to improved geophones and other motion or seismic sensors. More specifically, this invention relates to a system for reducing wind noise and other background noise that may interfere with signals sensed-by a geophone or other ground motion or seismic sensor.

2. Related Art

Noise can be a significant problem for the acquisition of high-quality seismic data. In general, there are two types of noise that are of particular concern. First is noise created by winds that blow against seismic sensors, such as geophones. Strong winds can interrupt seismic survey operations or decrease the detection range of sensors by reducing signal-to-noise ratios below acceptable limits. Second is acoustic noise. Seismic sensors such as geophones are also sensitive to ground motion induced by acoustic signals. Acoustic noise levels, therefore, also influence the signal-to-noise ratios recorded by such sensors, potentially limiting their detection capability.

One common practice for reducing the effect of wind and acoustic noise is to bury the sensor. However, burial of sensors is time consuming, and thereby costly. Also, local ground conditions may preclude the burying of sensors to depths which sufficiently reduce noise.

Thus, a need exists for an improved system and method for reducing the effects of wind and/or acoustic noise on geophones and similar sensors, which does not require the burial of such sensors.

SUMMARY OF THE INVENTION

The present invention provides a system and method for reducing acoustic, wind or other background noise that may interfere with a seismic sensor, such as a geophone. In one embodiment, a shield is provided to enclose the geophone and thereby protect it from harmful noise. This shield may comprise a substantially rigid shell, a structural damping material layer coupled to the shell, an acoustically absorptive material layer coupled to the structural damping material layer, and a compliant seal coupled to the ground or other reference surface. The shield, however, need not have all of the above-described elements, so long as the shield is configured to provide an acoustic transmission loss, a wind noise loss, or both. Thus, for example, the shield may comprise only the rigid shell. The shield may alternatively comprises only the shell coupled to a mass layer. The shield may alternatively comprise the shell, the mass layer, a structural damping material layer and/or an acoustically absorptive material layer. In the above-described embodiments, the shield should generally not interfere with the functioning of the sensor, such as by physically contacting the sensor.

In another embodiment, the shield and the seismic sensor may be provided as an integral unit. Thus, the shield and the sensor may be coupled by means of a suspension. In such an embodiment, the suspension may be designed in such a way that the shield may act as a bias mass to improve the coupling between the seismic sensor and the reference surface, without interfering with the measurements of the sensor.

DETAILED DESCRIPTION OF THE PREFERRED EMBODIMENTS

Reference will now be made to the present preferred embodiments of the invention, examples of which are illustrated in the accompanying drawings.

In embodiments of the present invention, a shield is provided that encloses a geophone or other sensor, thereby protecting it from direct exposure to the wind. Preferably, the shield is constructed so as also to provide a large acoustic transmission loss, thereby shielding the geophone or other sensor from sound energy associated with the wind or ambient acoustic levels. In general, it is desirable to reduce the wind and acoustic noise levels as much as possible, given a set of geometric and cost constraints in a given application.

Figure 1A:
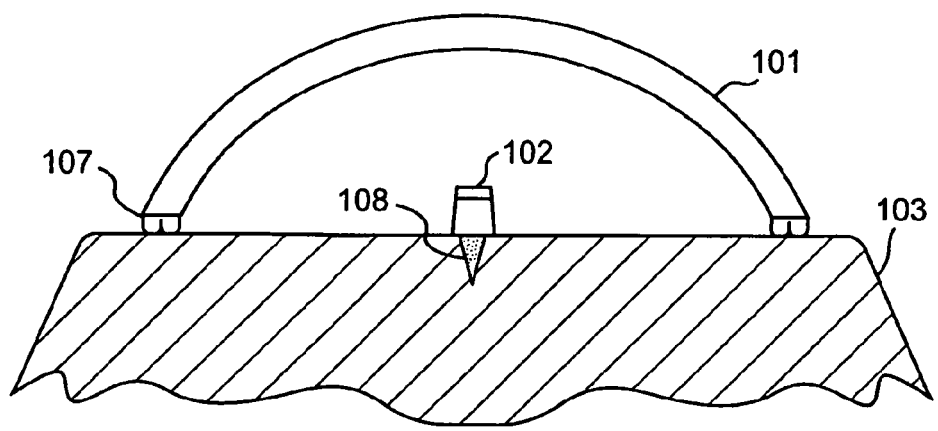
FIG. 1A depicts a cross-sectional side view of a shield according to an embodiment of the present invention.
Figure 1B:
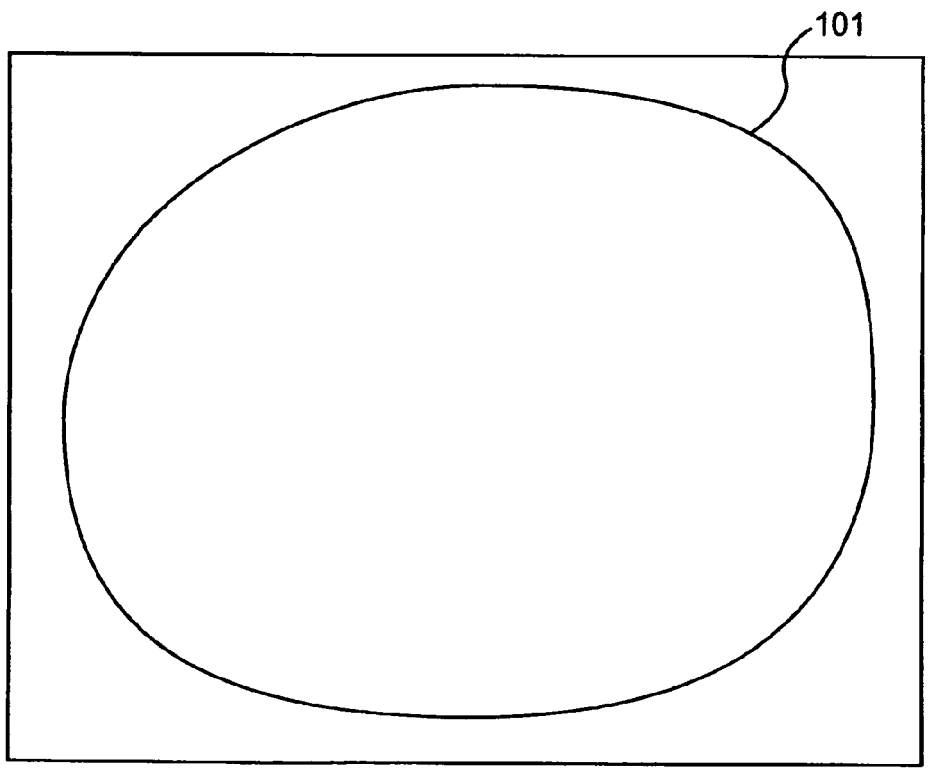
FIG. 1B depicts a top view of the shield of FIG. 1A.

An embodiment of the present invention can be seen in FIGS. 1A–B. FIG. 1A shows a side-view cross-section of an embodiment of the present invention. A shield 101 is provided such that it encloses geophone 102, which is coupled to reference surface 103. As would be understood by one skilled in the art, a geophone is a sensor that is used to detect ground motion. Geophones are often used to detect earthquakes and machine vibrations, as well as in oil exploration and mining. In general, geophones comprise a metal case with a mass suspended on a spring between a series of magnets. Usually, they are coupled to the reference surface by means of a spike, such as spike 108, as shown in FIG. 1A. As the reference surface moves, a relative motion is induced between the metal case and the suspended internal mass.

This relative motion, in the presence of the magnetic field caused by the magnets, induces small currents in electric coils that are attached to the suspended internal mass. These currents are proportional to the velocity of the reference surface and can be used to determine the velocity of the motion of the reference surface. Moreover, while the present invention is preferably used with a geophone, it could also be used with a variety of sensors in situations where reducing vibration from wind and acoustic noise is desirable. For example, the present invention could be used with an accelerometer, which measures the acceleration of the reference surface rather than velocity.

In one embodiment, shield 101 is approximately 2 feet in diameter and is generally dome-shaped, that is, when looked at from a top view, as in FIG. 1B, it has a generally circular cross-section. However, as should be understood by one skilled in the art, the present invention is not limited to such a shape, and other suitable shapes are within the scope of this invention.

In this embodiment, shield 101 is simply a rigid shell, made from a material such as a metal or fiberglass. In some embodiments, the rigid shall may comprise a lead sheet or lead vinyl layer with a mass of at least 1 lb. per square foot and preferably 2 lbs. per square foot. This rigid shell protects the geophone 102 from noise such as wind noise.

Compliant seal 107 couples shield 101 to the reference surface 103. Preferably, compliant seal 107 may be made from an air filled rubber tube. Alternatively, compliant seal 107 may be made from a sand filled rubber tube, such that the weight of sand effectively seals the shield 101 and prevents acoustic energy or wind from reaching the geophone. In general, the compliant seal should substantially eliminate gaps that may provide acoustic flanking paths. Thus, compliant seal 107 may be made from a wide variety of materials, so long as it substantially prevents acoustic energy or wind from going under shield 101.

Figure 2:
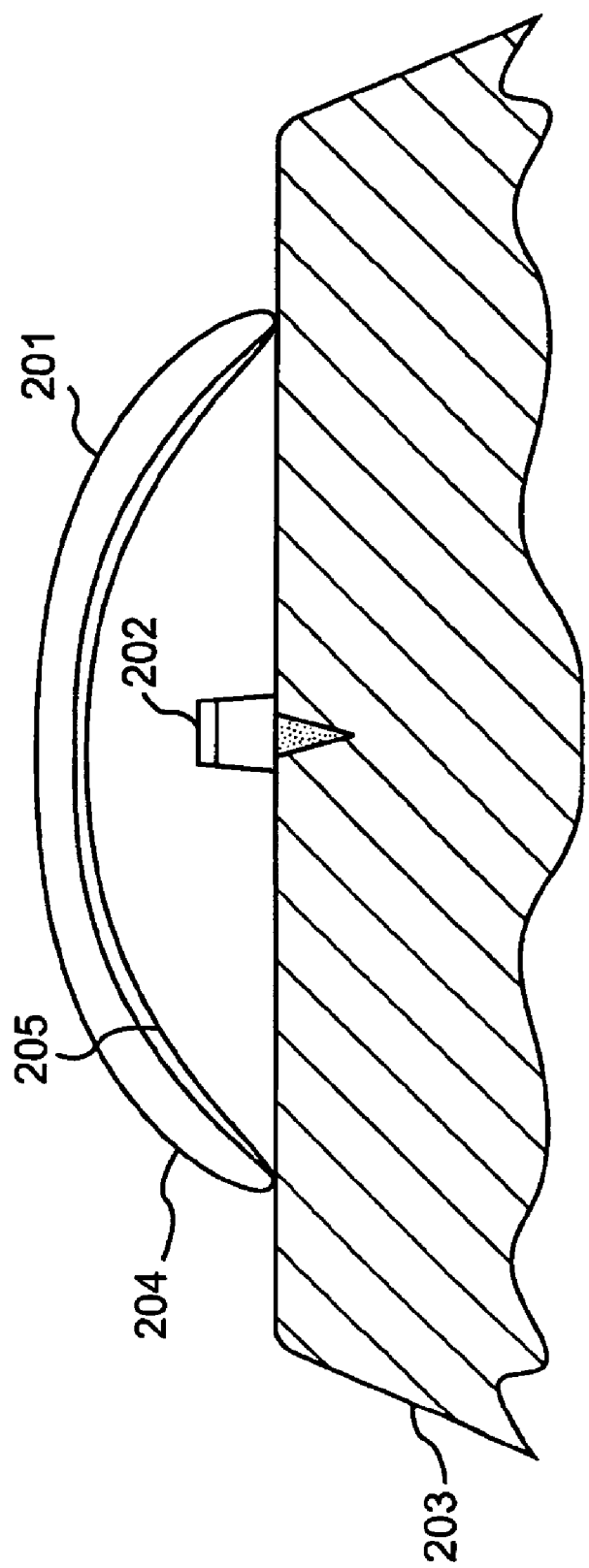
FIG. 2 depicts a cross-sectional side view of a shield according to another embodiment of the present invention.

A cross-sectional side-view of an alternative embodiment is shown in FIG. 2. In the embodiment in FIG. 2, a shield 201 is provided to enclose geophone 202, which is coupled to reference surface 203. Shield 201 comprises a mass layer 204 which surrounds a rigid shell 205. The mass layer 204 is preferably made from a lead vinyl layer with a mass of at least 1 lb. per square foot, and preferably 2 lbs. per square foot. Rigid shell 205, preferably made from a metal or fiberglass, prevents the mass layer 204 from contacting the geophone 202. Alternatively, the positions of rigid shell 205 and mass layer 204 could be reversed, so long as neither layer touches the enclosed geophone 202.

Figure 3:
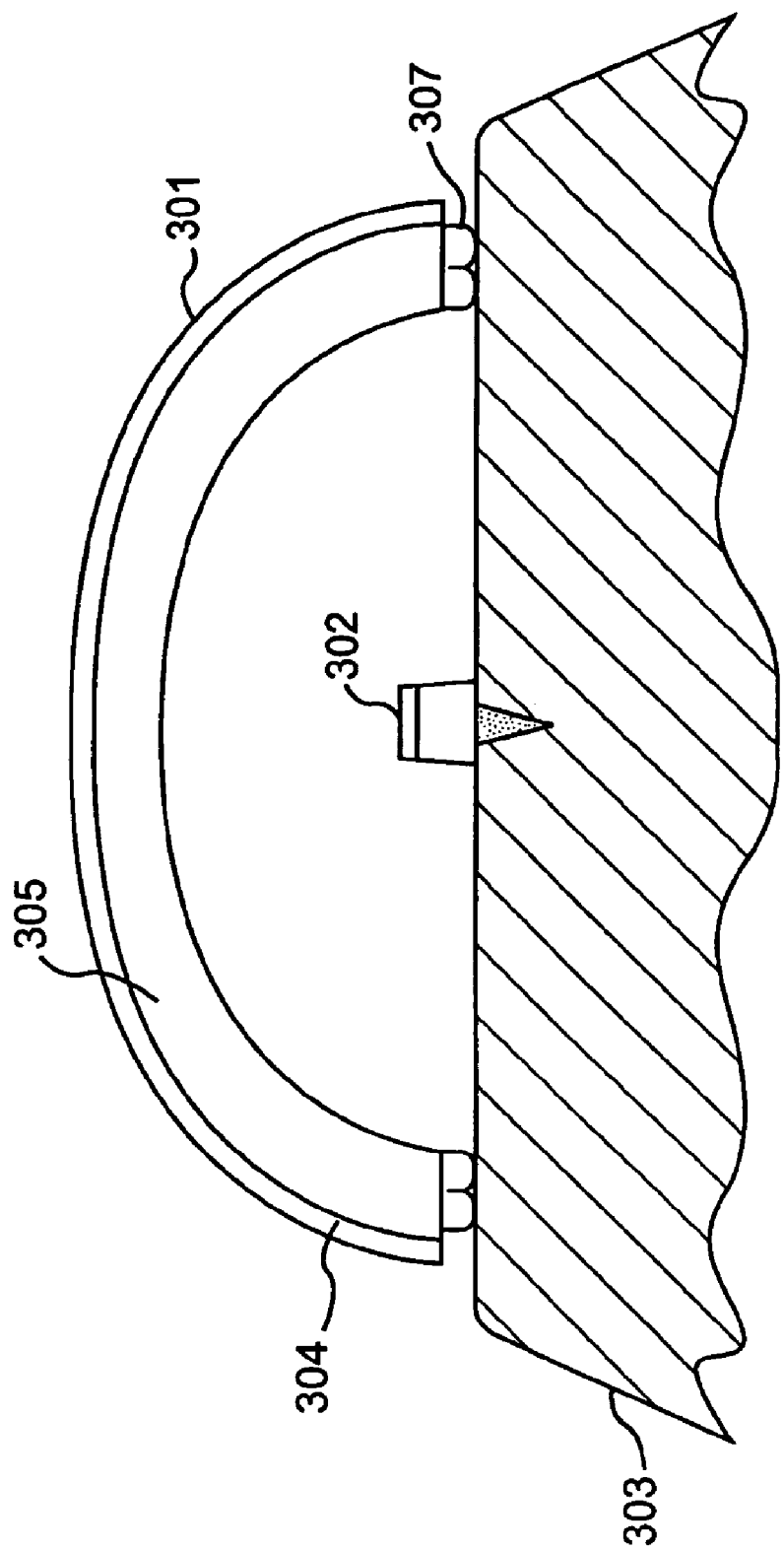
FIG. 3 depicts a cross-sectional side view of a shield according to another embodiment of the present invention.

A cross-sectional side-view of still another alternative embodiment is shown in FIG. 3. Once again, shield 301 is provided to enclose geophone 302, which is coupled to reference surface 303. Shield 301 comprises a rigid shell 304 coupled to a structural damping material layer 305 to prevent the build-up of vibration energy in the shell. In preferred embodiments, structural damping material layer 305 is made from an elastomeric material, such as a rubber or plastic material, or any other material that provides visco-elastic damping. Damping may also be provided by constrained layer damping. Seal 307, similar to seal 107 (FIG. 1A), may also be provided.

Figure 4A:
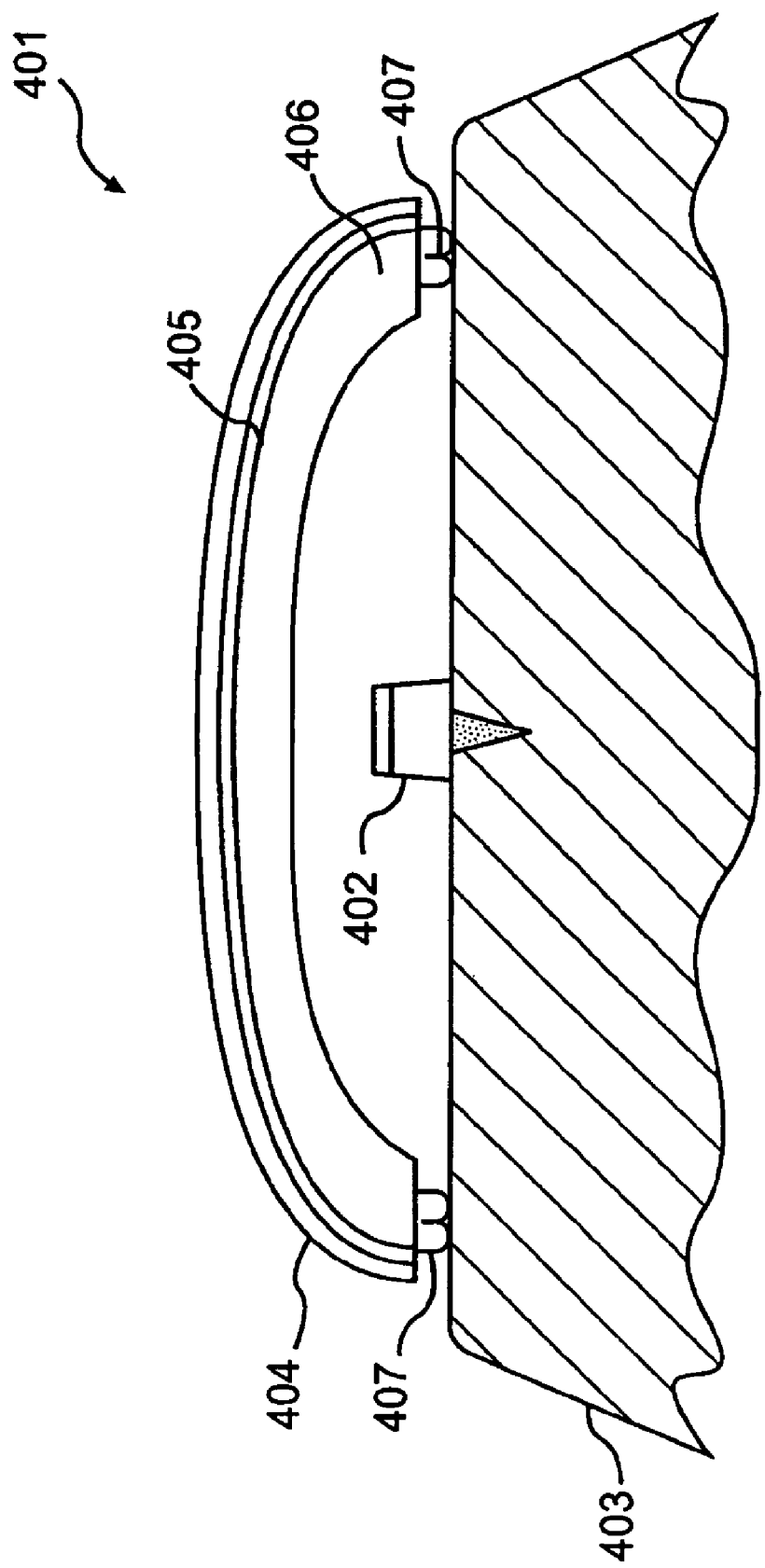
FIG. 4A depicts a cross-sectional side view of a shield according to another embodiment of the present invention.

A cross-sectional side-view of still another alternative embodiment is shown in FIG. 4A. Once again, shield 401 is provided to enclose geophone 402, which is coupled to reference surface 403. Shield 401 comprises a rigid shell 404 coupled to a structural damping material layer 405 to prevent the build-up of vibration energy in the shell (similar to structural damping material layer 305 (FIG. 3)). Shell 404 is preferably substantially rigid, and formed into an aerodynamic shape such that structural excitation from local flow separation and turbulence is minimized. Preferred materials for shell 404 include metal or fiberglass. For example, shell 404 may comprise a lead sheet or a lead vinyl blanket which surrounds a rigid piece of plastic or the like in order to maintain the shape of shell 404. In the embodiment shown in FIG. 4A, shell 404 also functions as a "mass layer," in that the shell itself has a significant mass, so there is no need to provide a separate mass layer. A mass, layer, whether provided as the shell or separately, preferably provides an acoustic transmission loss, a wind noise loss, or both. For example, if a shell 404 has a mass of at least 1 pound per square foot (and preferably about 2 pounds per square foot), it may provide the necessary amount of acoustic transmission loss, wind noise loss, or both in a given application.

Figure 4B:
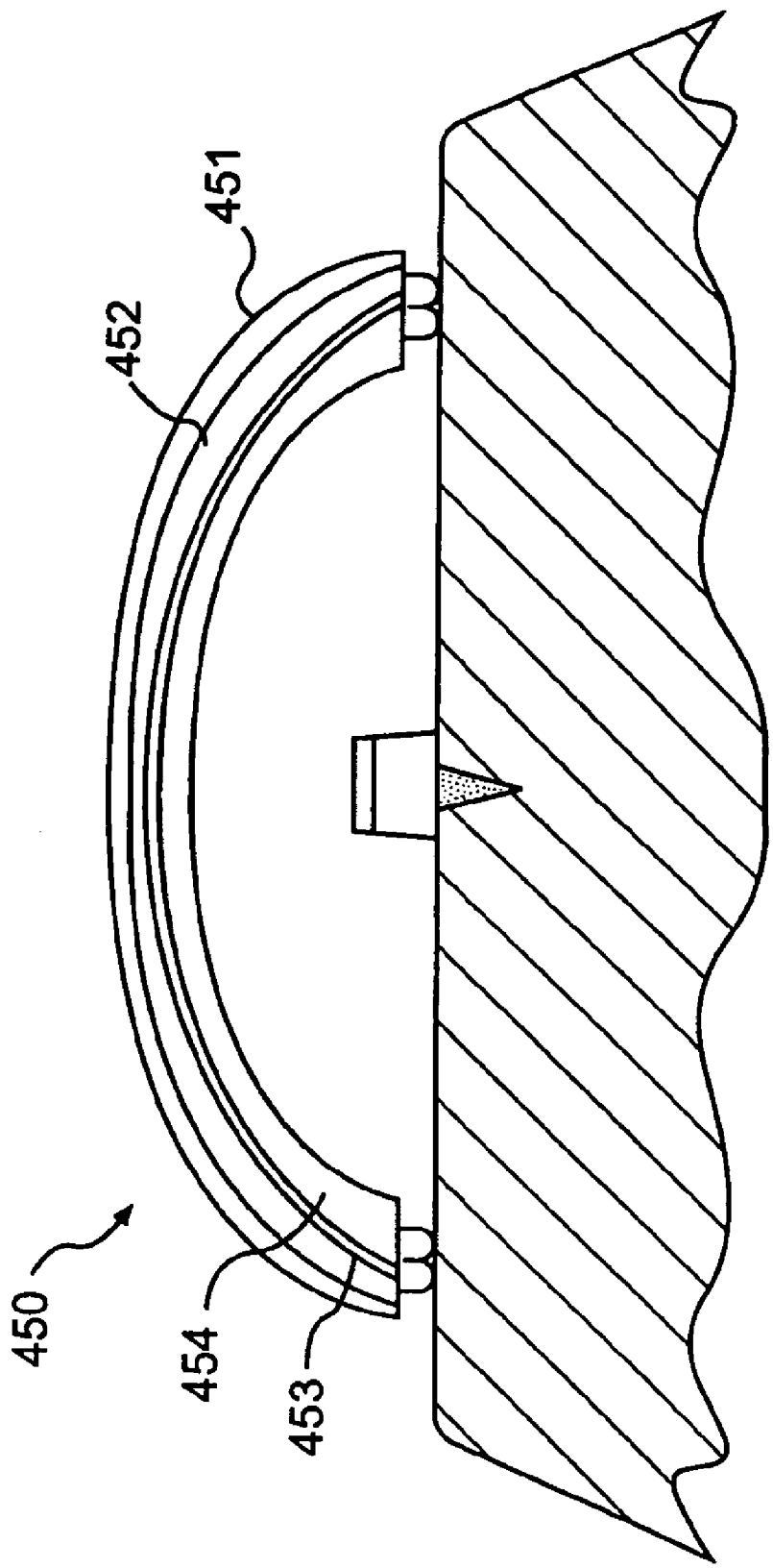
FIG. 4B depicts a cross-sectional side view of a shield according to another embodiment of the present invention.

Alternatively, if additional mass is needed, a mass layer may be provided separately from the shell. For example, in the embodiment shown in FIG. 4B, shield 450 is provided with a shell 451 and a mass layer 452, which is coupled to the shell 451, provided separately. The mass layer 452 may comprise a lead vinyl blanket. In addition, in the embodiment shown in FIG. 4B, structural damping material layer 453 is provided coupled to the mass layer 452 and acoustically absorptive material layer 454 is provided coupled to the structural damping material layer 453. Characteristics of structural damping material layers and acoustically absorptive material layers are discussed in more detail below with respect to FIG. 4A. Moreover, mass layers of different weight per area may be used to provide various acoustic transmission or wind noise losses as required by the particular application. For example, a mass layer of at least 1 pound per square foot (and preferably about 2 pounds per square foot) may be used in particular applications.

Turning back to the embodiment shown in FIG. 4A, immediately adjacent to shell 404 is structural damping material layer 405. Structural damping material layer 405 is preferably coupled to the shell 404 to prevent the build-up of vibration energy in the shell, and is similar to structural damping material layer 305 (FIG. 3).

Immediately adjacent to structural damping material layer 405 is acoustically absorptive material layer 406. Acoustically absorptive material layer 406 reduces resonant acoustic modes within the volume enclosed by shield 401. Preferably, acoustically absorptive material layer 406 is made from an open cell foam material, and can be made from fiberglass. In a preferred embodiment, acoustically absorptive material layer 406 is the thickest of the layers of shield 401, and may be approximately 1 inch thick, although this may vary widely from application to application. A preferred overall thickness for shield 401 (including shell 404, structural damping material layer 405, and acoustically absorptive material layer 406) is approximately 2 inches, although again, this could vary widely from application to application.

Finally, a compliant seal 407 couples shield 401 to the reference surface 403. This is similar to seal 107 (FIG. 1A).

In general, while representative dimensions and specific material compositions of the various shields were described above, these are not critical to the invention. Rather, a variety of dimensions and materials can be employed depending on the performance bandwidth that is relevant in a given application and the amount of attenuation required. Nevertheless, it is preferable that while the shield encloses the geophone, it also provides sufficient airspace to prevent contact during the course of usual use of the sensor. Moreover, not all of the layers described above need be provided in a specific application.

Tests have been conducted showing the effectiveness of the present invention. A shield built generally according to the embodiment described in FIGS. 1A–B was tested on a day in which wind speeds were generally between 10 and 20 miles per hour, and overall geophone noise levels were observed to correlate with wind velocities. Wind noise levels were measured for a standard OYO Geospace GS-32CT geophone placed underneath a simplified shield made according to the embodiment described in FIGS. 1A–B. Thus, the shield used in the test consisted of a shell made of a lead sheet with a mass of 1$lb$. per square foot, and 2 feet in diameter. Measurements were taken of the reduction of wind noise levels of the shielded geophone versus that of an unshielded reference geophone placed nearby. The results are shown in FIG. 5.

Figure 5:
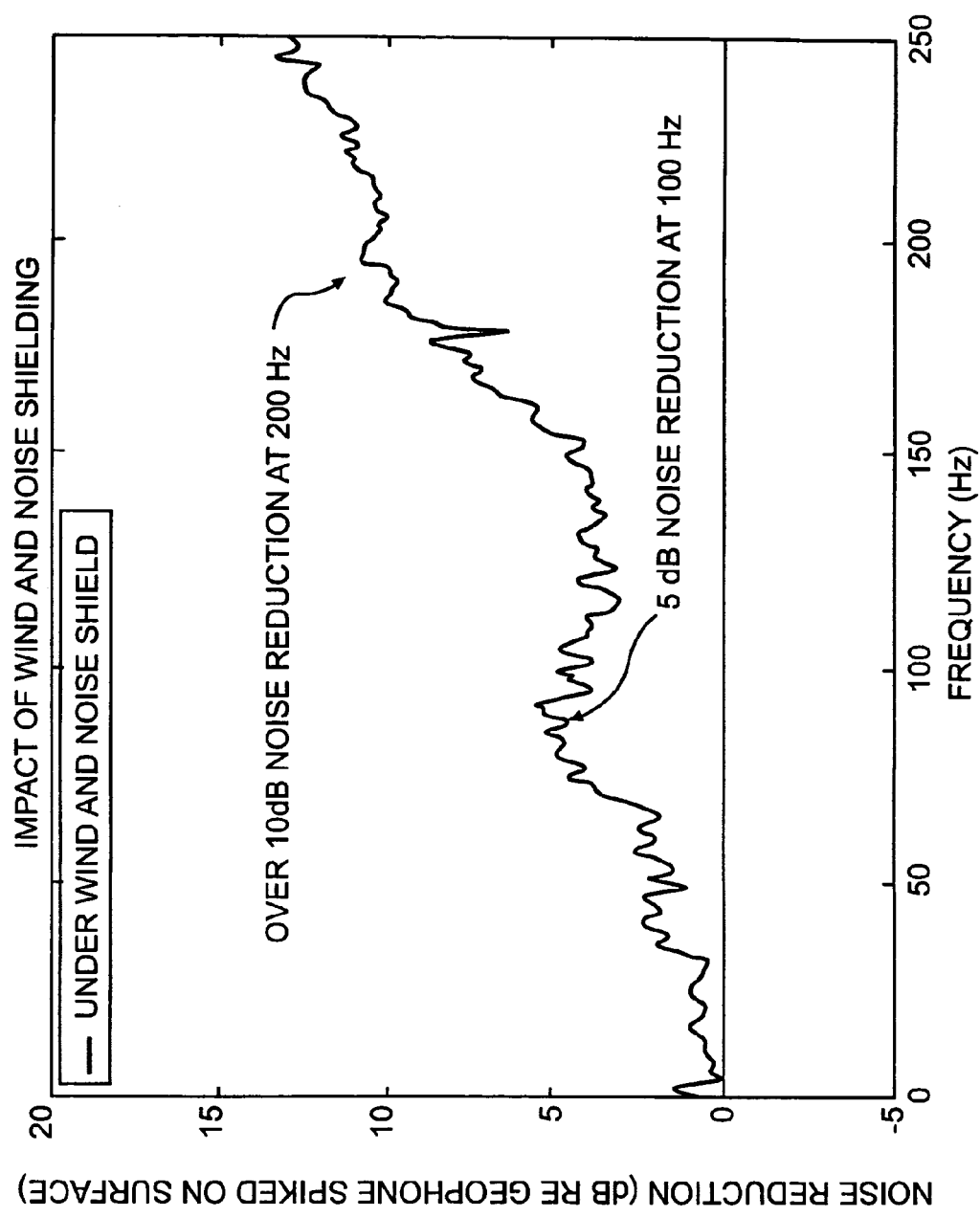
FIG. 5 depicts the results of comparison test between a geophone enclosed by a shield according to an embodiment of the present invention and an unshielded geophone.

As can be seen from FIG. 5, a significant wind noise reduction is observed, which increases as frequency increases. For example, at 200 Hz, a 10 dB reduction of wind noise was observed, and at 100 Hz, a 5 dB reduction of wind noise was observed. These noise reduction levels are similar to the noise reduction levels achieved by geophone burial, the current common method of reducing noise. Further reductions of noise can be expected by applying the embodiment described with respect to FIG. 4A. In particular, in addition to wind noise reductions, significant acoustic noise reductions could be obtained as well.

Figure 6:
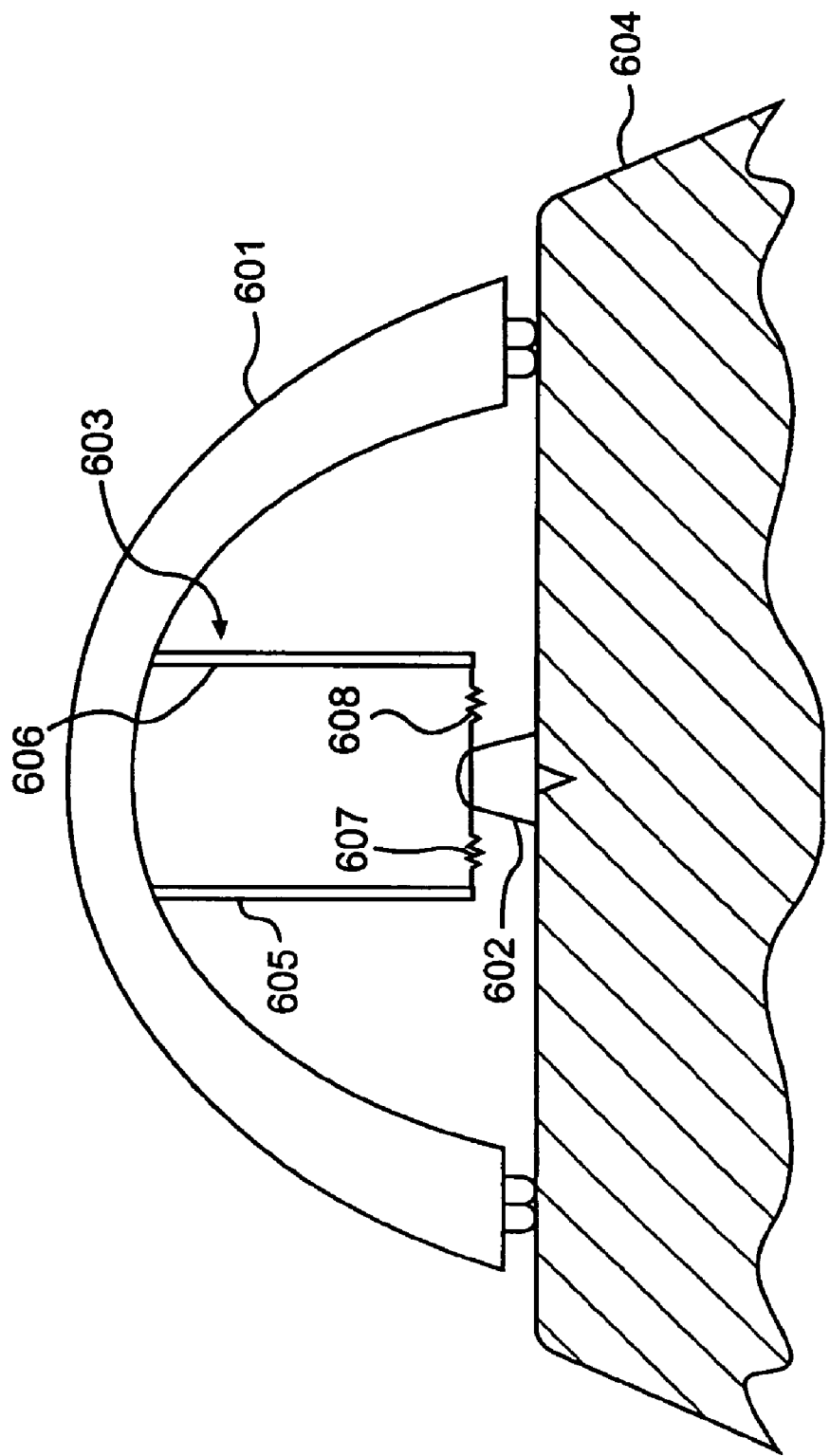
FIG. 6 depicts a cross-sectional side view of a shield according to another embodiment of the present invention.

A cross-sectional side-view of another embodiment of the present invention is shown in FIG. 6. In this embodiment, shield 601 and geophone 602 are provided as an integral unit. In such an embodiment, shield 601 could provide a bias mass to geophone 602, in order to improve the coupling of geophone 602 to reference surface 604. For a more detailed discussion of improved geophone coupling, see commonly owned U.S. Provisional Application 60/427,426 and 60/427,425, filed Nov. 19, 2002, entitled "Ground Sensor with Improved Seismic Coupling," and "Method and. System for Evaluating Geophone Coupling" respectively, and their respective co-pending non-provisional applications of the same name, filed simultaneously herewith, the entirety of all of which are hereby incorporated herein by reference.

Shield 601 may be provided as described above with respect to FIGS. 1A–B, 2, 3, 4A–B, or in any other arrangement that provides the necessary wind and/or acoustic screening for a given application. Shield 601 and geophone 602 are coupled by means of suspension 603. In a preferred embodiment, suspension 603 is designed so that the mass of shield 601 does not substantially influence the measurements of geophone 602. Thus, suspension 603 may comprise rigid connectors 605 and 606, and spring/damper systems 607 and 608. Suspension designs are further discussed in the above mentioned Provisional Patent Application 60/427,426.

Finally, the present invention could be used with the invention described in the patent application entitled "Improved Geophone," inventor James E. Barger, having assignee in common with assignee of this instant application, and filed on even date herewith, the entirety of which is hereby incorporated herein by reference.

Although particular embodiments of the invention have been described and illustrated herein, it is recognized that modifications and variations may readily occur to those skilled in the art and consequently it is intended that the claims be interpreted to cover such modifications and equivalents.

The invention claimed is:

1. A system for sensing motion of a surface comprising:
a seismic sensor coupled to the surface; and
a shield configured to enclose the seismic sensor, wherein the shield is configured to provide an acoustic transmission loss, a wind noise loss, or both;
wherein the shield further comprises a compliant seal that couples the shield to the surface, and at least three distinct layers selected from a group consisting of a rigid shell, an acoustically absorptive material layer, a structural damping material layer and a mass layer.

2. The system of claim 1, wherein the shield comprises:
a substantially rigid shell.

3. The system of claim 2, wherein the shell weighs at least about 1 pound per square foot.

4. The system of claim 2, wherein the shell weighs about 2 pounds per square foot.

5. The system of claim 2, wherein the shell comprises metal.

6. The system of claim 2, wherein the shell comprises fiberglass.

7. The system of claim 2, wherein the shell comprises a lead vinyl layer.

8. The system of claim 2, wherein a cross section of the shell is substantially circular in shape.

9. The system of claim 2, wherein the shell is about 2 feet in diameter.

10. The system of claim 2, wherein the shield further comprises a mass layer coupled to the shell.

11. The system of claim 10, wherein the mass layer weighs at least about 1 pound per square foot.

12. The system of claim 10, wherein the mass layer weighs about 2 pounds per square foot.

13. The system of claim 10, wherein the mass layer comprises a lead vinyl layer.

14. The system of claim 2, wherein the shield further comprises:
a structural damping material layer coupled to the shell.

15. The system of claim 14, wherein the structural damping material layer comprises an elastomeric material.

16. The system of claim 14, wherein the structural damping material layer comprises a rubber material.

17. The system of claim 14, wherein the structural damping material layer comprises a plastic material.

18. The system of claim 14, wherein the shield further comprises:
an acoustically absorptive material layer coupled to the structural damping material layer.

19. The system of claim 18, wherein the acoustically absorptive material layer comprises an open cell foam.

20. The system of claim 18, wherein the acoustically absorptive material comprises a fiberglass.

21. The system of claim 1, wherein the complaint seal comprises an air filled rubber tube.

22. The system of claim 1, wherein the compliant seal comprises a sand filled rubber tube.

23. A system for sensing motion of a reference surface comprising:
a seismic sensor, a shield, and a suspension;
wherein the shield is coupled to the seismic sensor using the suspension, the seismic sensor is coupled to the surface, and the shield is configured to enclose the seismic sensor and to provide an acoustic transmission loss, a wind noise loss, or both, and
wherein the shield comprises at least three distinct layers selected from a group consisting of a rigid shell, an acoustically absorptive material layer, a structural damping material layer and a mass layer.

24. The system of claim 23, wherein the shield comprises: a substantially rigid shell.

25. The system of claim 24, wherein the shield further comprises: a structural damping material layer coupled to the shell;
an acoustically absorptive material layer coupled to the structural damping material layer; and
a compliant seal, wherein the compliant seal couples the shell to the surface.

26. The system of claim 23, wherein the suspension is configured such that the shield provides a bias mass to the seismic sensor.

27. A method for sensing motion of a surface comprising:
coupling a seismic sensor to the surface; and
enclosing the seismic sensor with a shield, wherein the shield is configured to provide an acoustic transmission loss, a wind noise loss, or both, and wherein the shield further comprises a compliant seal, wherein the compliant seal couples the shield to the surface, and at least three distinct layers selected from a group consisting of a rigid shell, an acoustically absorptive material layer, a structural damping material layer and a mass layer.

28. The method of claim 27, wherein the shield comprises:
a substantially rigid shell.

29. The method of claim 28, wherein the shield further comprises:
a structural damping material layer coupled to the shell.

30. The method of claim 29, wherein the shield further comprises:
an acoustically absorptive material layer coupled to the structural damping material layer.

* * * * *

UNITED STATES PATENT AND TRADEMARK OFFICE
CERTIFICATE OF CORRECTION

PATENT NO. : 7,255,196 B1  Page 1 of 1
APPLICATION NO. : 10/713935
DATED : August 14, 2007
INVENTOR(S) : Coney et al.

It is certified that error appears in the above-identified patent and that said Letters Patent is hereby corrected as shown below:

Column 6, line 54, change "complaint" to -- compliant --

Signed and Sealed this

Twenty-sixth Day of February, 2008

JON W. DUDAS
*Director of the United States Patent and Trademark Office*